United States Patent
Armstrong et al.

(10) Patent No.: US 12,130,971 B2
(45) Date of Patent: Oct. 29, 2024

(54) METHOD FOR OBTAINING A POSITION OF A PERIPHERAL DEVICE

(71) Applicant: Sony Interactive Entertainment Europe Limited, London (GB)

(72) Inventors: Calum Armstrong, London (GB); Paul Welton, London (GB)

(73) Assignee: Sony Interactive Entertainment Europe Limited (GB)

( * ) Notice: Subject to any disclaimer, the term of this patent is extended or adjusted under 35 U.S.C. 154(b) by 0 days.

(21) Appl. No.: 18/150,886

(22) Filed: Jan. 6, 2023

(65) Prior Publication Data
US 2023/0221807 A1 Jul. 13, 2023

(30) Foreign Application Priority Data

Jan. 7, 2022 (GB) .................................... 2200180

(51) Int. Cl.
| | |
|---|---|
| *G06F 3/033* | (2013.01) |
| *A63F 13/215* | (2014.01) |
| *G01S 5/30* | (2006.01) |
| *G06F 3/01* | (2006.01) |

(52) U.S. Cl.
CPC .............. *G06F 3/033* (2013.01); *G01S 5/30* (2013.01); *G06F 3/011* (2013.01); *G06F 3/012* (2013.01); *A63F 13/215* (2014.09)

(58) Field of Classification Search
CPC .... G06F 3/011–015; G06F 3/017; G06F 3/16; G06F 3/167
See application file for complete search history.

(56) References Cited

U.S. PATENT DOCUMENTS

| | | | | |
|---|---|---|---|---|
| 9,911,395 | B1* | 3/2018 | Townsend | G09G 3/3406 |
| 11,086,416 | B2* | 8/2021 | Connellan | G06F 3/0425 |
| 11,209,541 | B1* | 12/2021 | Gris | G01S 15/101 |
| 11,269,047 | B2* | 3/2022 | Riccardi | G06F 3/017 |
| 11,433,546 | B1* | 9/2022 | Assaf | B25J 5/007 |
| 11,438,867 | B2* | 9/2022 | Lowe | G01S 11/16 |
| 11,442,608 | B1* | 9/2022 | Barros | G06F 3/0481 |
| 11,486,961 | B2* | 11/2022 | Przybyla | G01S 5/30 |
| 11,719,850 | B2* | 8/2023 | Castleman | G06F 3/0346 |
| | | | | 324/332 |
| 11,726,161 | B1* | 8/2023 | Eubank | H04W 4/20 |
| | | | | 367/125 |
| 2006/0210101 | A1* | 9/2006 | Ishibashi | H04S 7/302 |
| | | | | 381/300 |

(Continued)

OTHER PUBLICATIONS

Extended European Search Report including Written Opinion for Application No. 23150634.6 dated May 8, 2023, pp. 1-9.

(Continued)

*Primary Examiner* — Patrick F Marinelli
(74) *Attorney, Agent, or Firm* — Lerner David LLP (57) ABSTRACT

A method for obtaining a position of a peripheral device for an audiovisual entertainment system, the method comprising: controlling an audio source to output an audio signal at a first time; determining a second time at which the audio signal arrives at an audio detector, wherein the peripheral device comprises at least one of the audio source and audio detector; and estimating a position of the peripheral device based on an acoustic time-of-flight between the first time and the second time.

9 Claims, 7 Drawing Sheets

(56) References Cited

U.S. PATENT DOCUMENTS

| | | | |
|---|---|---|---|
| 2011/0060220 A1* | 3/2011 | Roche | G06F 3/03545 |
| | | | 600/437 |
| 2011/0202306 A1* | 8/2011 | Eng | A63F 13/24 |
| | | | 702/150 |
| 2012/0062729 A1* | 3/2012 | Hart | H04N 7/142 |
| | | | 348/135 |
| 2016/0195940 A1* | 7/2016 | Hall | G06F 3/048 |
| | | | 345/158 |
| 2017/0098320 A1* | 4/2017 | Borrelli | G06Q 50/06 |
| 2017/0219685 A1* | 8/2017 | Chikkappa | G01S 5/186 |
| 2018/0310116 A1* | 10/2018 | Arteaga | G06F 3/012 |
| 2019/0113966 A1* | 4/2019 | Connellan | G01S 5/16 |
| 2019/0187244 A1* | 6/2019 | Riccardi | G01S 5/186 |
| 2020/0135198 A1* | 4/2020 | Mandl | G01S 13/867 |
| 2020/0264303 A1* | 8/2020 | Schwab | H01Q 1/007 |
| 2021/0011562 A1* | 1/2021 | Connellan | G06F 3/0346 |
| 2021/0216135 A1* | 7/2021 | Connellan | G01C 21/1652 |
| 2021/0217247 A1* | 7/2021 | Jones | G06F 3/0346 |
| 2022/0300070 A1* | 9/2022 | Iodice | G01S 15/08 |
| 2023/0075644 A1* | 3/2023 | Stafford | G06F 3/011 |
| 2023/0214170 A1* | 7/2023 | Armstrong | G06F 3/011 |
| | | | 700/94 |
| 2023/0221807 A1* | 7/2023 | Armstrong | G06F 3/011 |
| | | | 345/156 |

OTHER PUBLICATIONS

Combined Search and Examination Report including Written Opinion for Application No. GB2200180.4 mailed Aug. 23, 2022, pp. 1-11.

* cited by examiner

METHOD FOR OBTAINING A POSITION OF A PERIPHERAL DEVICE

CROSS-REFERENCE TO RELATED APPLICATIONS

The present application claims priority from United Kingdom Patent Application No. 2200180.4, filed Jan. 7, 2022, the disclosure of which is incorporated herein by reference.

TECHNICAL FIELD

The following disclosure relates to methods for obtaining a position of a peripheral device in an audiovisual entertainment system, such as a gaming system. The following disclosure also relates to methods for obtaining a position of a person who is using an audiovisual entertainment system. Computer programs, systems and devices implementing the methods are also described.

BACKGROUND

In an audiovisual entertainment system, various peripheral devices such as handheld controllers, companion touchscreen interfaces, audio headsets and audiovisual headsets (e.g. VR or AR headsets) may be used by a user of the system, such as one or more people watching a movie or playing a game on the audiovisual entertainment system.

There are various scenarios where it is useful to be able to locate a peripheral device and/or track movement of a peripheral device. For example, in a sports game, a handheld controller may be tracked to define a sporting move such as a golf swing. As another example, a location of a companion touchscreen may be obtained in order to extend a display from a main screen to the companion touchscreen.

One known way of locating a peripheral device is to use a camera. For example, a PlayStation® Move controller can be located using a PlayStation® Camera.

There are also various scenarios where it is useful to be able to locate the user and/or track movement of the user. For example, in a dance game, a user's limbs may be individually tracked.

The user can also be located with a camera, for example by using feature detection in images to detect facial features or limbs.

However, camera-based methods for locating a peripheral device or a user are not suitable for all situations. For example, in a case where a number of users or a number of peripheral devices concurrently interacting with an audiovisual entertainment system exceeds a threshold, a camera-based method may become less effective. Similarly, if lighting conditions in a room containing the audiovisual entertainment system differ from an expected lighting condition (e.g. low light conditions), a camera-based method may be less effective.

Accordingly, it is desirable to provide an alternative way of obtaining a position of a peripheral device in an audiovisual entertainment system, or an alternative way of obtaining a position of a person who is using an audiovisual entertainment system.

Such an alternative way can then be used independently from a camera-based method, or together with a camera-based method. For example, such an alternative way may be used: as an alternative to a camera-based method as described above; as a fallback option in situations where a camera-based method is not sufficiently effective; or as a confirmatory method to be used together with a camera-based method.

SUMMARY

According to a first aspect, the present disclosure provides a method for obtaining a position of a peripheral device for an audiovisual entertainment system, the method comprising: controlling an audio source to output an audio signal at a first time; determining a second time at which the audio signal arrives at an audio detector, wherein the peripheral device comprises at least one of the audio source and audio detector; and estimating a position of the peripheral device based on an acoustic time-of-flight between the first time and the second time.

By using an audio signal that is transmitted or received by the peripheral device, the position of the peripheral device can be determined without requiring a camera. Additionally, the time-of-flight for an audio signal in a typical room is long enough to be measurable (around 3 ms per meter along the path from the source to the detector at room temperature).

Preferably, the audio signal is an ultrasonic audio signal.

Ultrasonic signals can be used as audio signals without affecting a user's experience of the audiovisual entertainment system Preferably, the peripheral device comprises both the audio source and the audio detector, and the acoustic signal undergoes a reflection between the audio source and the audio detector.

By using a reflection, the audio source and audio detector can be contained within the peripheral device, without requiring modification of another component of the audiovisual entertainment system.

Preferably, the peripheral device comprises one of the audio source and the audio detector, and the other of the audio source and the audio detector is located at a fixed hub device or at a second peripheral device.

By using a fixed hub device or a second peripheral device, a relative position of the peripheral device can be determined.

Preferably, in the method: the audio source comprises a plurality of audio source elements at different positions, and the position of the peripheral device is estimated based on a plurality of acoustic times-of-flight for respective audio signals transmitted between the audio source elements and the acoustic detector, or the audio detector comprises a plurality of audio detector elements at different positions, and the position of the peripheral device is estimated based on a plurality of acoustic times-of-flight for respective audio signals transmitted between the audio source and the audio detector elements.

By using multiple sources or multiple detectors, the position of the peripheral device can be triangulated in multiple dimensions. More preferably, the audio source comprises at least three audio source elements, or the audio detector comprises at least three audio detector elements.

Preferably, the method comprises obtaining a temperature measurement for the audiovisual entertainment system and estimating the position of the peripheral device based on the acoustic time-of-flight between the first time and the second time and the temperature measurement.

By taking account of temperature, the position of the peripheral device can be determined more accurately.

Preferably, the method comprises: controlling a starting amplitude of the audio signal when output from the audio source; and measuring a final amplitude of the audio signal when received at the audio detector, wherein the position of the peripheral device is estimated based on an acoustic time-of-flight between the first time and the second time and based on a comparison between the final amplitude and the starting amplitude. In one example, the acoustic time-of-flight is discarded if a difference between the final amplitude and the starting amplitude exceeds a threshold.

By taking into account the amplitude of the signal, the method can distinguish between a complete received acoustic signal and a partial received acoustic signal (for example due to an obstacle between the audio source and audio detector) or a partial reflected acoustic signal (for example, when an obstacle is located between the peripheral device and a wall), and thereby improve the estimation of the position of the peripheral device.

According to a second aspect, the present disclosure provides a method of obtaining a position of a person who is using an audiovisual entertainment system, the method comprising: obtaining a position of a peripheral device for the audiovisual entertainment system, using the method of the first aspect; and estimating the position of the person based on the position of the peripheral device.

By using an audio signal that is transmitted or received by the peripheral device, the position of the person can be determined without requiring a camera.

Preferably, the method of the second aspect further comprises obtaining an orientation of the peripheral device, wherein the position of the person is estimated based on the position and orientation of the peripheral device.

By using the orientation of the peripheral device, the position of the person may be more accurately determined. For example, a handheld peripheral may be designed such that it is naturally held at a first orientation when the person is standing and holding the peripheral, at a second orientation when the person is sitting and holding the peripheral, and at a third orientation when the person is lying down and holding the peripheral.

Preferably, the method of the second aspect further comprises estimating an offset between the position of the peripheral device and the position of the person, based on the orientation of the peripheral device. For example, the offset may be based on an estimated height of the person.

Preferably, in the method of the second aspect, the position of the person is a position of the person's head.

Preferably, the method of the second aspect further comprises estimating an orientation of the person's head. For example, with a head-mounted peripheral device, an orientation of the peripheral device may match an orientation of the person's head.

According to a third aspect, the present disclosure provides a computer program comprising instructions which, when executed by a computer of an audiovisual entertainment system, cause the computer to control the audiovisual entertainment system to perform a method according to the first aspect or the second aspect.

According to a fourth aspect, the present disclosure provides a non-transitory storage medium storing instructions which, when executed by a computer of an audiovisual entertainment system, cause the computer to control the audiovisual entertainment system to perform a method according to the first aspect or the second aspect.

According to a fifth aspect, the present disclosure provides a signal containing instructions which, when executed by a computer of an audiovisual entertainment system, cause the computer to control the audiovisual entertainment system to perform a method according to the first aspect or the second aspect.

According to a sixth aspect, the present disclosure provides an audiovisual entertainment system configured to perform a method according to the first aspect or the second aspect.

According to a seventh aspect, the present disclosure provides a peripheral device for an audiovisual entertainment system, configured to perform a method according to the first aspect or the second aspect.

DETAILED DESCRIPTION

Figure 1:
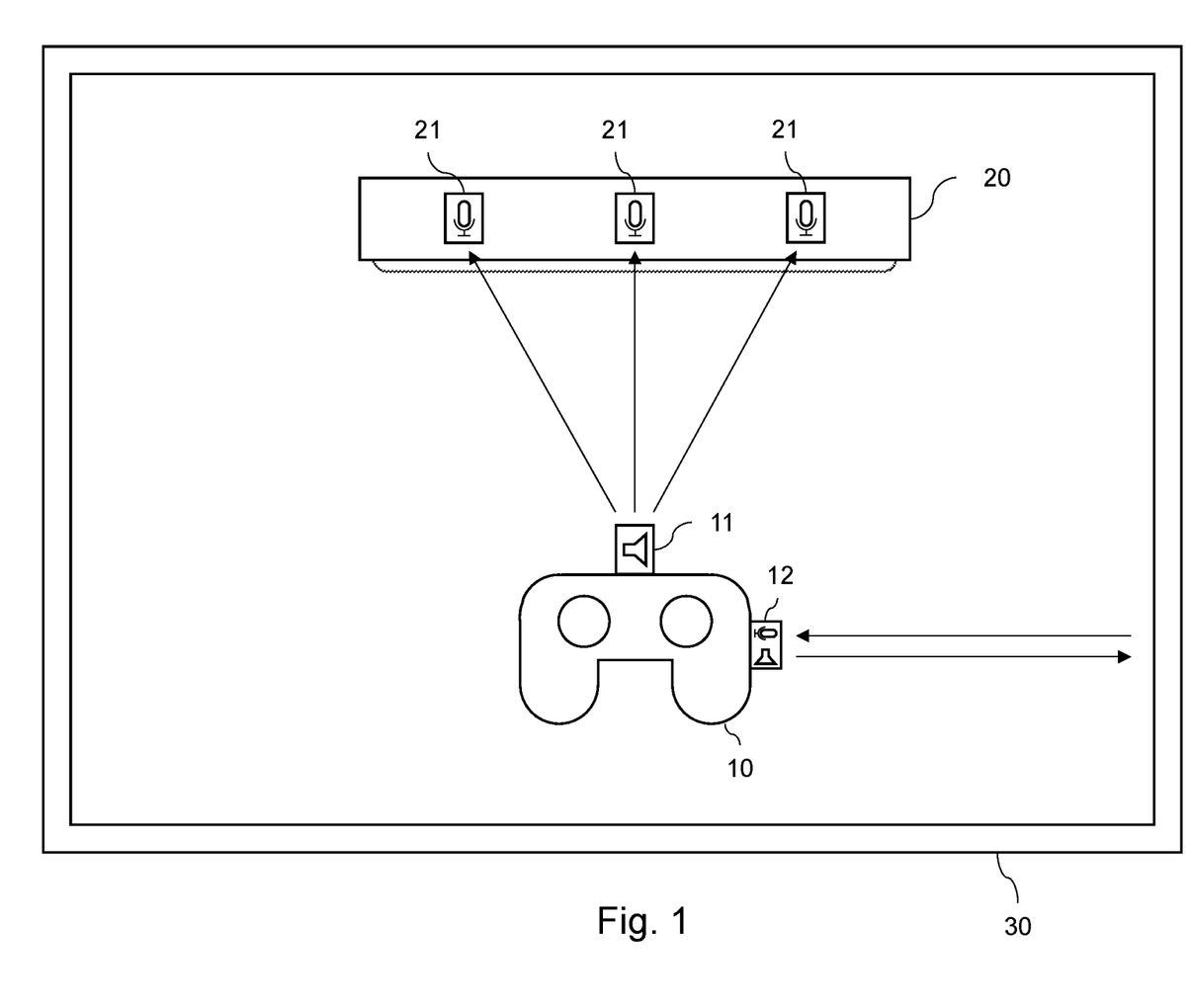
FIG. 1 is a schematic diagram of an audiovisual entertainment system viewed from above in which a method according to the invention may be implemented.

FIG. 1 is a schematic diagram of an audiovisual entertainment system viewed from above in which a method according to the invention may be implemented.

As shown in FIG. 1, an audiovisual entertainment system may comprise a peripheral device 10 and a fixed hub device 20.

The peripheral device 10 may, for example, be a handheld controller, a companion touchscreen interface, or an audio headsets or audiovisual headset (e.g. VR or AR headsets). The audiovisual entertainment system may comprise multiple peripheral devices 10, such as one controller per player of a game.

The fixed hub device 20 may, for example, be a television, a home cinema system, a projector, a gaming computer (such as a PlayStation unit), or a dedicated peripheral-positioning device. The fixed hub device 20 may further be a one or more parts of a network of devices, such as a television connected to a gaming computer and connected to external speakers. Herein, "fixed" means that the fixed hub device is not expected to move during typical usage of the audiovisual entertainment system, although the hub device may nevertheless be moveable.

Typically, the audiovisual entertainment system is set up in a room, as indicated by walls 30.

In order obtain a position of the peripheral device 10, or to obtain a position of each of a plurality of peripheral devices, a computer-implemented method may be performed one or more times. The computer-implemented method may be performed using the peripheral device 10 alone, or using a combination of the peripheral device 10 and the fixed hub device 20.

In the method for obtaining the position of the peripheral device, one or more audio sources 11, 12 and audio detectors 21, 12 are used to determine an acoustic time of flight, and thereby determine a length of the path travelled by the audio signal from the audio source to the audio detector. At least one audio source is controlled to output an audio signal at a first time. The audio signal is received by an audio detector at a second time. The acoustic time of flight is the difference between the first time and the second time.

The audio sources may, for example, be speakers or buzzers, and the audio detectors may, for example, be microphones. The audio sources and detectors may use ultrasonic frequencies so that the positioning method cannot be heard by a user of the audiovisual entertainment system. The audio sources and detectors may also perform other functions such as playing an audible signal for the person using the audiovisual entertainment system or recording speech from the user. The audio source may generate a predetermined signal, such as a predetermined pulse signal, which can be identified and distinguished from other signals when it is received by the audio detectors.

In a first example shown in FIG. 1, an audio source 11 is mounted on the peripheral device 10 and a plurality of audio detectors 21 are mounted on the fixed hub device 20. An acoustic time of flight between the audio source 11 and at least one audio detector 21 is indicative of a distance between the peripheral device 10 and the fixed hub device 20, giving a basic estimate of the position of the peripheral device 10 relative to the fixed hub device 20. Furthermore, by using a plurality of audio detectors 21, and determining a time of flight to each of the audio detectors 21, a position of the peripheral device 10 can be estimated in multiple dimensions (for example triangulated in two or three dimensions).

In a second example shown in FIG. 1, a combined audio source and detector 12 is mounted on the peripheral device 10. In this case an acoustic time of flight can be measured based on a reflection of sound. For example, the reflection may occur at a wall 30 of the room in which the audiovisual entertainment system is set up.

In each of the first and second examples, it is possible for the audio detectors 21 or 12 to only partially receive the acoustic signal. For example, if a small obstacle is located between the audio source 11 and one or more of the audio detectors 21, or between the audio source and detector 12 and the wall 30, then the acoustic signal may be partially reflected by the small obstacle.

In the case of the audio detectors 21, this could for example cause the received acoustic signal to have a lower amplitude than could otherwise be expected.

In the case of audio detector 12, this could for example mean that the acoustic signal is partially received at each of two separate times and each of the two received signals has a lower than expected amplitude.

In view of such amplitude-modifying effects, it is preferable to control a starting amplitude of the audio signal when output from the audio source, and measure a final amplitude of the audio signal when received at the audio detector. In this way, the estimate of the position of the peripheral device can take into account amplitude-modifying effects such as obstacles within the room. Alternatively, control and measurement of the amplitude can simply be used to filter out time of flight measurements which may be less accurate due to an obstacle.

Although the first and second examples are both shown in FIG. 1, these examples can be used independently, by either providing the audio source 11 and audio detectors 21, or providing the combined audio source and detector 12. Of course, if used together, their obtained positions can be combined to provide an improved estimate of the position of the peripheral device 10.

More generally, one or more audio sources and one or more audio detectors can be arranged on or in either of the peripheral device 10 and the fixed hub device 20. Different audio sources may be distinguished in a variety of ways, for example, based on the timing of an audio signal, or by producing audio signals with different frequencies or different waveforms. Furthermore, the method can be performed without requiring a fixed hub device, either by using a reflection as in the second example, or by instead estimating a position of the peripheral device 10 relative to a second peripheral device that comprises an audio source or audio detector.

Figure 2A:
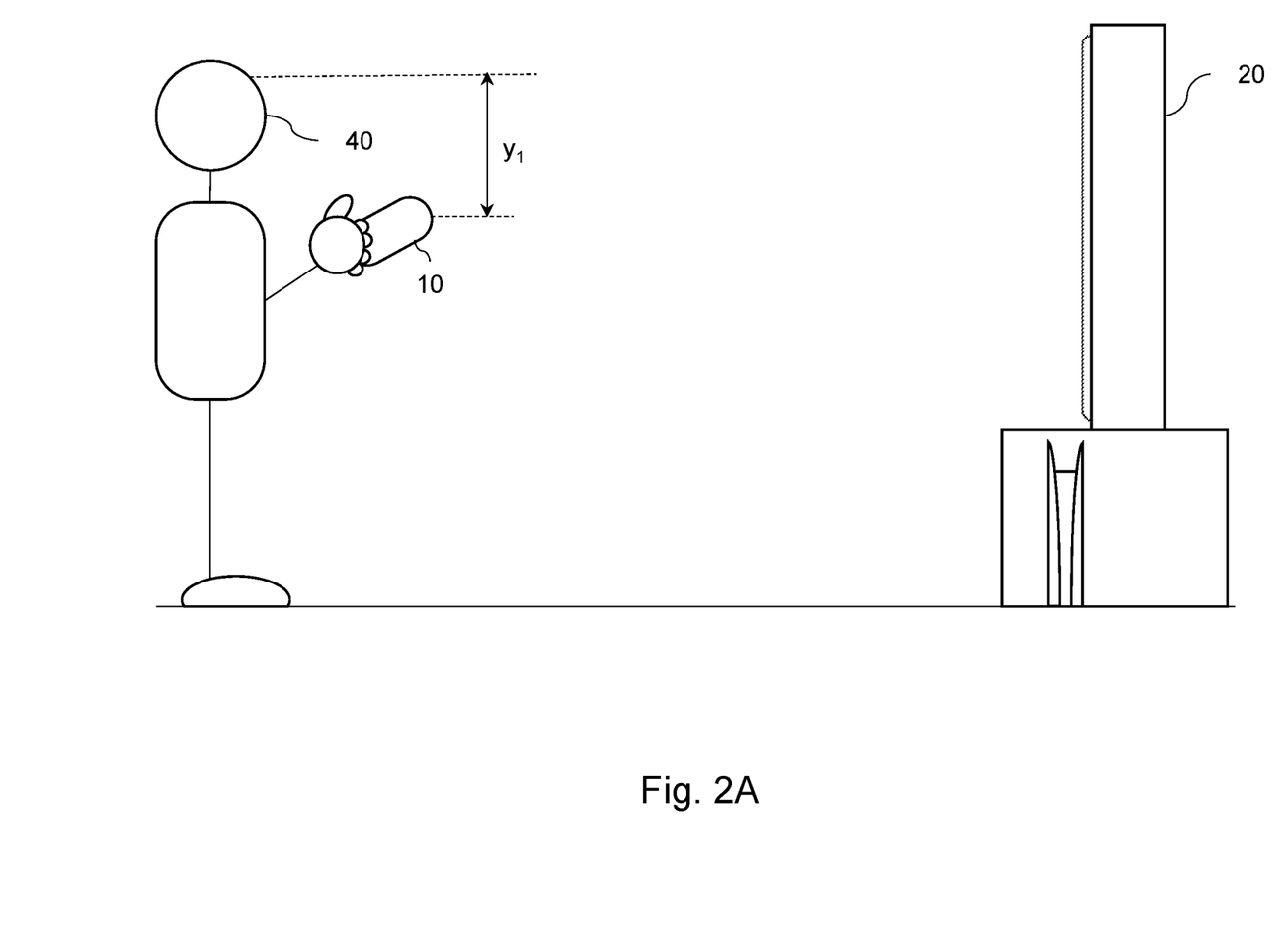
FIGS. 2A, 2B and 2C are schematic diagrams of an audiovisual entertainment system viewed from the side in which a method according to the invention may be implemented, with a person using the system in different positions.
Figure 2B:
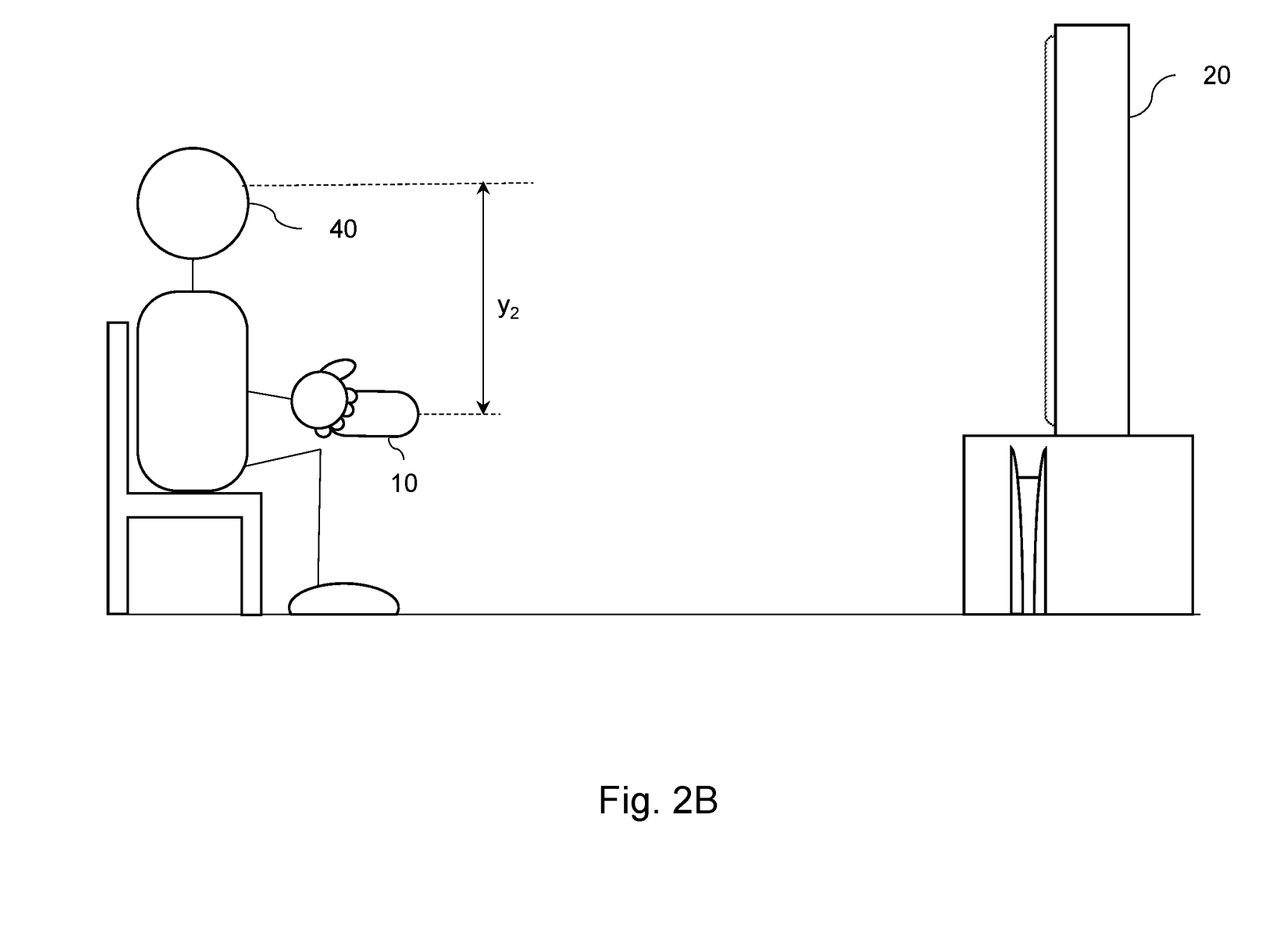
Figure 2C:
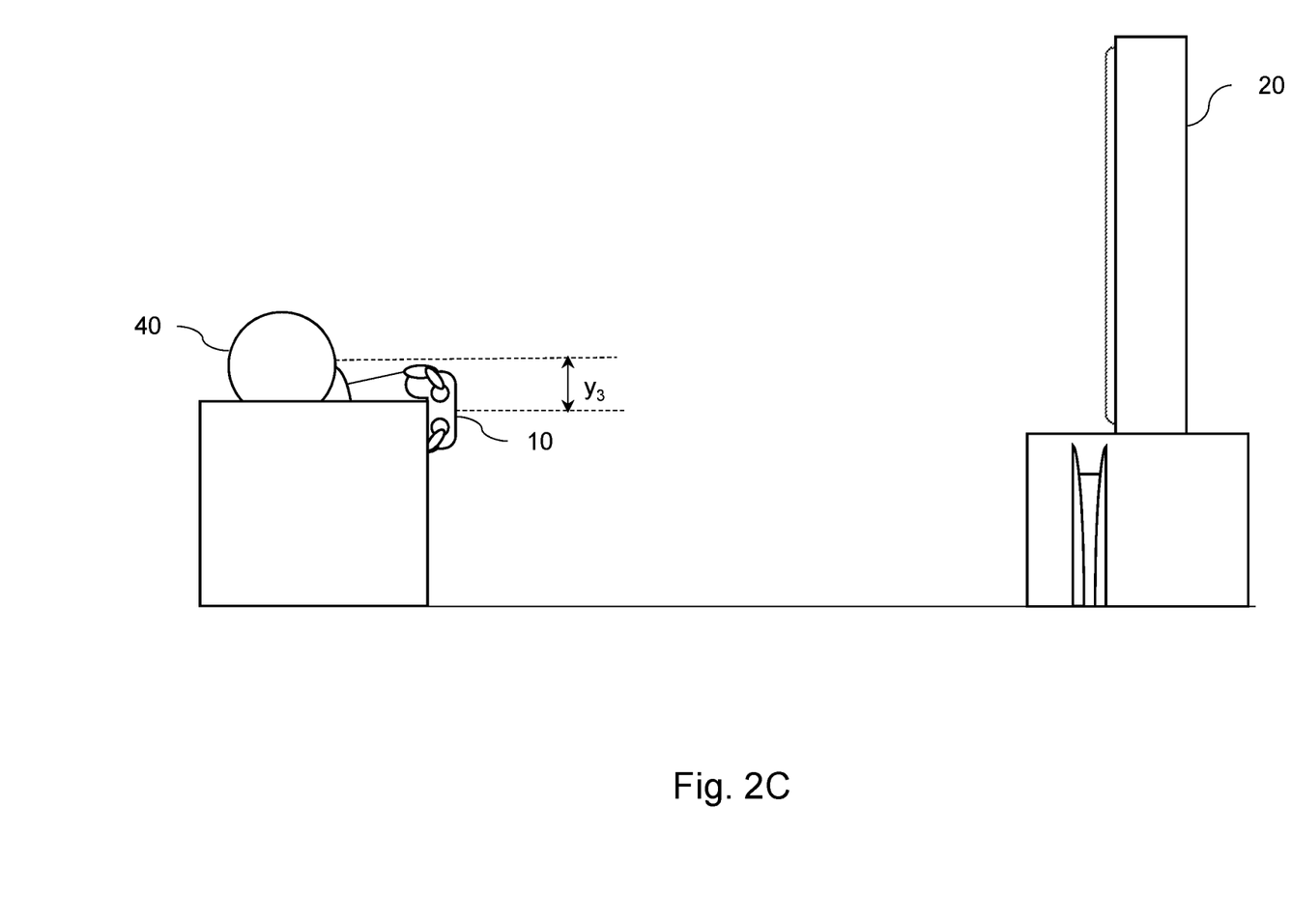

Furthermore, the method for obtaining a position of the peripheral device 10 may be used in a method for obtaining a position of a person 40, as illustrated in FIGS. 2A to 2C.

The displacement between a body part of the person 40 (such as their head) and the peripheral device 10 may be estimated based on the position of the peripheral device 10. For example, the position of the peripheral device may be used to estimate a height of the person 40.

Furthermore, the displacement between a body part of the person 40 and the peripheral device 10 may be estimated based on a combination of the position and orientation of the peripheral device 10.

More specifically, FIGS. 2A, 2B and 2C are schematic diagrams of an audiovisual entertainment system viewed from the side in which a method according to the invention may be implemented, with a person using the system in different positions.

In FIG. 2A, a person 40 is in a first position (e.g. a standing position). In FIG. 2B, the person 40 is in a second position (e.g. a sitting position). In FIG. 2C, the person 40 is in a third position (e.g. lying sideways on a sofa).

As shown in FIGS. 2A to 2C, different positions of the person 40 may be associated with different displacements between the person 40 and the peripheral device 10. For example, it may be expected that the person 40 holds a handheld controller 10 higher relative to their head in a standing position than in a sitting position. Accordingly, the vertical displacement $y_1$ between the head of the person 40 and the controller 10 in FIG. 2A is shorter than the vertical displacement $y_2$ between the head of the person 40 and the controller 10 in FIG. 2B. As another example, it may be expected that the vertical displacement $y_3$ (shown in FIG. 2C) between the head of the person 40 and the peripheral device 10 in a lying down position is smaller than either the sitting or standing positions.

As also shown in FIGS. 2A to 2C, different positions of the person 40 may be associated with different orientations of the peripheral device 10. For example, it may be expected that the person 40 holds a handheld controller 10 at a raised angle in a standing position (FIG. 2A), at an approximately horizontal angle in a sitting position (FIG. 2B), and sideways in a lying position (FIG. 2C). The orientation of the peripheral device may, for example, be determined using one or more tilt switches in the peripheral device 10.

In one example, an offset y between the peripheral device 10 and a body part of the person 40 may be estimated by selecting an offset from a set of predetermined offsets based on the orientation of the peripheral device 10, and combining the selected offset with an obtained position of the peripheral device 10 to estimate a position of the person 40.

Figure 3A:
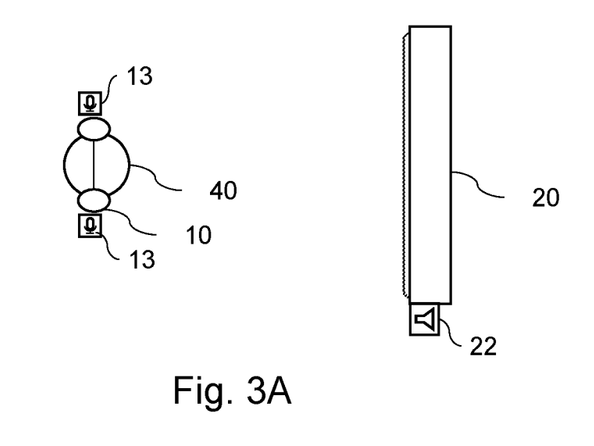
FIGS. 3A and 3B are schematic diagrams of another audiovisual entertainment system viewed from above in which a method according to the invention may be implemented.
Figure 3B:
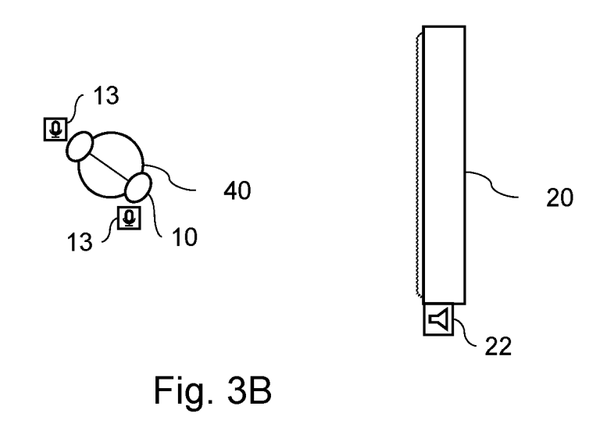

FIGS. 3A and 3B are schematic diagrams of another audiovisual entertainment system viewed from above in which a method according to the invention may be implemented.

In the examples of FIGS. 3A and 3B, the peripheral device 10 is an audio headset worn on the head of the person 40. As shown in FIGS. 3A and 3B, the headset 10 may comprise a plurality of audio detectors 13 arranged to receive an audio signal from an audio source 22 of the fixed hub device 20. In this arrangement, the position and/or orientation of the peripheral device 10 may be estimated based on different second times at which the audio signal is received at each of the audio detectors 13.

Figure 4:
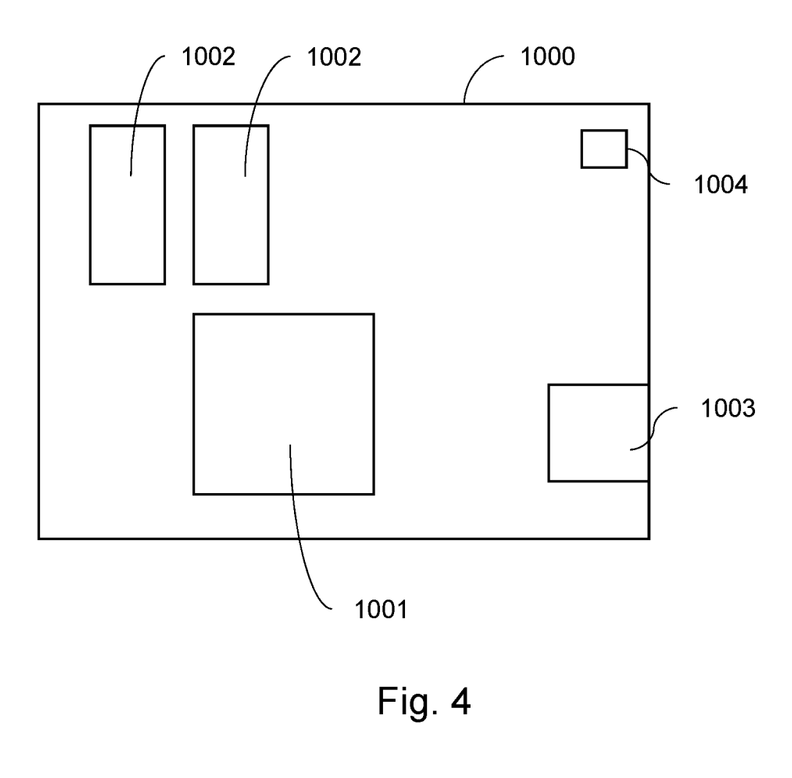
FIG. 4 is a schematic block diagram of a computer configured to implement a method according to the invention.

FIG. 4 is a schematic block diagram of a computer configured to implement a method according to the invention. The features of FIG. 4 may appear in the peripheral device 10 and/or the fixed hub device 20.

Referring to FIG. 4, the computer 1000 comprises a processor 1001, at least one memory 1002, and an input/output interface 1003. The processor 1001 may execute instructions stored in the memory 1002 in order to perform the above described method for obtaining a position of a peripheral device 10 (and optionally a position of a person 40). The input/output interface 1003 may be configured to output an audio signal via an audio source 11, 12, 22 and to receive an audio signal via an audio detector 12, 13, 21.

Additionally, the computer 1000 may comprise a temperature sensor 1004. The temperature sensor 1004 may be used to estimate an ambient air temperature, and thereby estimate a speed of sound in the ambient air, in order to improve the accuracy of estimated positions based on acoustic time of flight.

A first part of the above described methods may be performed in one computer 1000 and a second part of the above described methods may be performed in another computer 1000. For example, referring back to FIG. 1, a computer of the peripheral device 10 may output an audio signal via audio source 11 at a first time, and use a wireless electromagnetic interface to communicate the first time to the fixed hub device 20. A computer of the fixed hub device 20 may then receive the audio signal via audio detector 21 at a second time, and also receive the first time via the wireless electromagnetic interface. The computer of the fixed hub device 20 may then calculate a position of the peripheral device 10 based on the acoustic time of flight between the first and second times.

Figure 5:
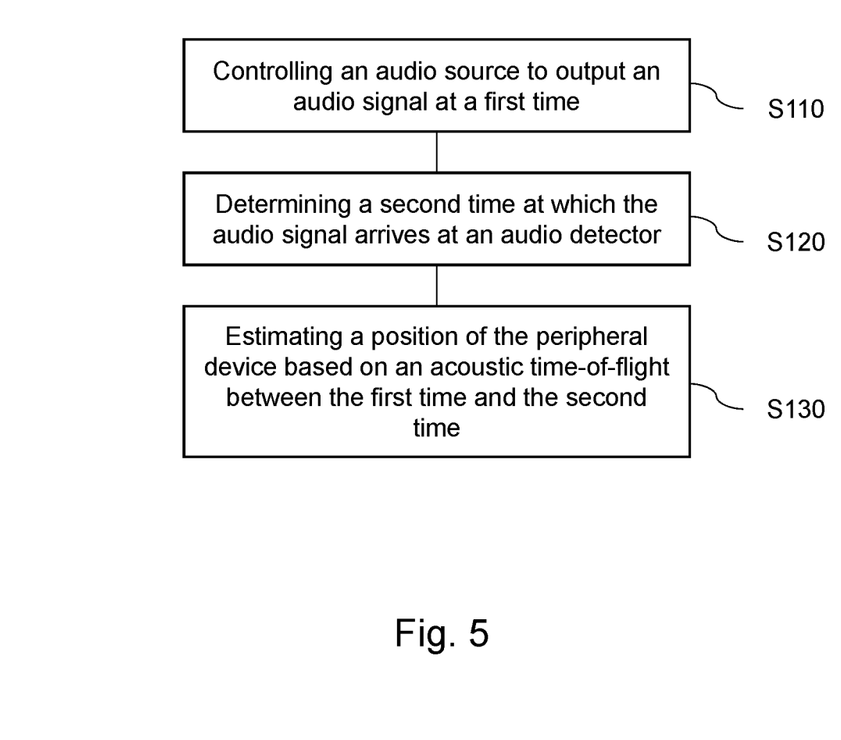
FIG. 5 is a flow chart schematically illustrating steps of a method according to the invention.

FIG. 5 is a flow chart schematically illustrating steps of a general method according to the invention.

At step S110, an audio source is controlled to output an audio signal at a first time. In some embodiments, the audio source is located on the peripheral device 10. In other embodiments, the audio source is located at a reference position, such as a position of the fixed hub device 20.

At step S120, an audio detector receives the audio signal, and a second time at which the audio signal was received is determined. In some embodiments, the audio detector is located on the peripheral device. In other embodiments, the audio detector is located at a reference position such as a position of the fixed hub device 20, although at least one of the audio source and audio detector is located on the peripheral device.

At step S130, a position of the peripheral device is estimated based on an acoustic time of flight between the first time and the second time. In the most basic example, the estimated position is a radial distance from the hub device 20 or from a wall 30. In more complex implementations using multiple audio sources and/or multiple audio detectors, the estimated position may be a triangulated 3D position.

The invention claimed is:

1. A method for obtaining a position of a person who is using an audiovisual entertainment system, the method comprising:
   controlling an audio source to output an audio signal at a first time;
   determining a second time at which the audio signal arrives at an audio detector, wherein the peripheral device comprises the audio source and the audio detector and the acoustic signal undergoes a reflection between the audio source and the audio detector; and
   estimating a position of the peripheral device based on an acoustic time-of-flight between the first time and the second time to obtain the position of the peripheral device;
   obtaining an orientation of the peripheral device;
   selecting an offset between the person and peripheral device based on the obtained orientation; and
   estimating the position of the person based on the selected offset and the estimated position of the peripheral device.

2. The method according to claim 1, wherein the audio signal is an ultrasonic audio signal.

3. The method according to claim 1, wherein:
   the audio source comprises a plurality of audio source elements at different positions, and the position of the peripheral device is estimated based on a plurality of acoustic times-of-flight for respective audio signals transmitted between the audio source elements and the acoustic detector; or
   the audio detector comprises a plurality of audio detector elements at different positions, and the position of the peripheral device is estimated based on a plurality of acoustic times-of-flight for respective audio signals transmitted between the audio source and the audio detector elements.

4. The method according to claim 1, further comprising obtaining a temperature measurement for the audiovisual entertainment system and estimating the position of the peripheral device based on the acoustic time-of-flight between the first time and the second time and the temperature measurement.

5. The method according to claim 1, further comprising:
   controlling a starting amplitude of the audio signal when output from the audio source; and
   measuring a final amplitude of the audio signal when received at the audio detector;
   wherein the position of the peripheral device is estimated based on an acoustic time-of-flight between the first time and the second time and based on a comparison between the final amplitude and the starting amplitude.

6. The method according to claim 1, wherein the position of the person is a position of a head of the person.

7. The method according to claim 6, further comprising estimating an orientation of the head of the person.

8. A non-transitory storage medium storing instructions which, when executed by a computer of an audiovisual entertainment system, cause the computer to control the audiovisual entertainment system to perform a method according to claim 1.

9. An audiovisual entertainment system configured to perform a method according to claim 1.

* * * * *